(12) United States Patent
Ryu

(10) Patent No.: US 12,504,790 B2
(45) Date of Patent: Dec. 23, 2025

(54) DISPLAY DEVICE AND METHOD OF MANUFACTURING THE SAME

(71) Applicant: Samsung Display Co., LTD., Yongin-si (KR)

(72) Inventor: Su Chang Ryu, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 182 days.

(21) Appl. No.: 18/339,900

(22) Filed: Jun. 22, 2023

(65) Prior Publication Data

US 2024/0019906 A1 Jan. 18, 2024

(30) Foreign Application Priority Data

Jul. 14, 2022 (KR) .................. 10-2022-0086843

(51) Int. Cl.
*G06F 1/16* (2006.01)

(52) U.S. Cl.
CPC .......... *G06F 1/1656* (2013.01); *G06F 1/1624* (2013.01); *G06F 1/1652* (2013.01)

(58) Field of Classification Search
CPC .... G06F 1/1656; G06F 1/1624; G06F 1/1652; H10K 59/12; H10K 59/1201; H10K 59/87; H10K 50/84; H10K 71/00; H10K 2102/311; G09F 9/301
See application file for complete search history.

(56) References Cited

U.S. PATENT DOCUMENTS

| | | | | |
|---|---|---|---|---|
| 9,989,995 | B2 * | 6/2018 | Kwak | G06F 1/1637 |
| 11,194,363 | B2 * | 12/2021 | Kim | G06F 1/1675 |
| 11,219,132 | B2 * | 1/2022 | Song | G06F 1/1624 |
| 11,269,379 | B2 | 3/2022 | Rao | |
| 11,315,443 | B2 * | 4/2022 | Han | G06F 1/1624 |
| 11,527,737 | B2 * | 12/2022 | Baek | G06F 3/041 |
| 11,662,771 | B2 * | 5/2023 | Kim | G06F 1/1652 |
| | | | | 361/679.01 |
| 11,775,016 | B2 * | 10/2023 | Choi | H04M 1/0237 |
| | | | | 361/679.01 |

(Continued)

FOREIGN PATENT DOCUMENTS

| | | |
|---|---|---|
| KR | 10-2016-0121031 A | 10/2016 |
| KR | 10-2017-0084402 A | 7/2017 |

(Continued)

*Primary Examiner* — Rockshana D Chowdhury
(74) *Attorney, Agent, or Firm* — Womble Bond Dickinson (US) LLP

(57) ABSTRACT

A display device includes a display panel including a first panel and a second panel, the first panel being located at one side of the second panel in a first direction, a support member configured to support a bottom surface of the display panel and assist in a sliding motion of the display panel in the first direction, and a filling member covered by the first panel and the support member at an end of the first panel in the first direction, where the first panel includes a first portion, a second portion, and a third portion, the first portion covering one surface of the support member and in contact, at least partially, with the other surface of the support member and extending in the first direction, the second portion being at least partially opposing the first portion and extending in a direction opposite the first direction.

16 Claims, 14 Drawing Sheets

(56) References Cited

U.S. PATENT DOCUMENTS

| | | | | |
|---|---|---|---|---|
| 11,778,080 | B2* | 10/2023 | Liu | G06F 1/1677 |
| | | | | 361/679.56 |
| 11,810,482 | B2* | 11/2023 | Wu | G06F 1/1635 |
| 11,849,549 | B2* | 12/2023 | Feng | G06F 1/1681 |
| 11,914,423 | B2* | 2/2024 | Shin | H04M 1/0268 |
| 11,921,545 | B2* | 3/2024 | Feng | H04M 1/0268 |
| 11,953,944 | B2* | 4/2024 | Choi | G06F 1/1652 |
| 12,016,142 | B2* | 6/2024 | Jiang | G09F 9/301 |
| 12,019,479 | B2* | 6/2024 | Han | G06F 1/1652 |
| 12,103,270 | B2* | 10/2024 | Song | B32B 17/06 |
| 12,114,443 | B2* | 10/2024 | An | G06F 1/1652 |
| 12,126,746 | B2* | 10/2024 | Jo | H04M 1/0268 |
| 12,181,917 | B2* | 12/2024 | Shin | G06F 1/1624 |
| 12,222,756 | B2* | 2/2025 | Zhao | G06F 1/1637 |
| 12,229,365 | B2* | 2/2025 | Park | G06F 1/1643 |
| 2006/0176243 | A1* | 8/2006 | Yeh | G06F 1/1624 |
| | | | | 345/30 |
| 2013/0002572 | A1* | 1/2013 | Jin | G06F 1/1637 |
| | | | | 345/173 |
| 2013/0058063 | A1* | 3/2013 | O'Brien | G06F 1/1624 |
| | | | | 361/807 |
| 2018/0102072 | A1* | 4/2018 | Lee | G02F 1/133305 |
| 2020/0267247 | A1* | 8/2020 | Song | H04M 1/0237 |
| 2020/0304613 | A1* | 9/2020 | Cha | G06F 1/1652 |

FOREIGN PATENT DOCUMENTS

| | | |
|---|---|---|
| KR | 10-2018-0091893 A | 8/2018 |
| KR | 10-2122349 B1 | 6/2020 |

\* cited by examiner

DISPLAY DEVICE AND METHOD OF MANUFACTURING THE SAME

CROSS-REFERENCE TO RELATED APPLICATION

This application claims priority to and the benefit of Korean Patent Application No. 10-2022-0086843 filed on Jul. 14, 2022, in the Korean Intellectual Property Office, the entire content of which is incorporated by reference herein.

BACKGROUND

1. Field

The present disclosure relates to a display device and a method of manufacturing the same.

2. Description of the Related Art

Display devices become more and more important as multimedia technology evolves. Accordingly, a variety of types of display devices such as organic light-emitting diode (OLED) display devices and liquid-crystal display (LCD) devices are used.

With the recent development of display technology, research and development on display devices with a flexible display have been actively conducted. A flexible display allows a display screen to be extended or reduced such as being folded or unfolded, bent or unbent, or sliding, thereby contributing significantly to a reduction in volume of a display device or a design change of a display device.

SUMMARY

Aspects and features of embodiments of the present disclosure provide a display device that prevents a spring back effect of a metal layer at an end of a sliding display device with a simple structure, alleviates the panel crack problem that occurs when a display panel is compressed into a shape having a curved surface, and has high resistance to impact.

However, aspects and features of embodiments of the present disclosure are not restricted to those set forth herein. The above and other aspects of the present disclosure will become more apparent to one of ordinary skill in the art to which the present disclosure pertains by referencing the detailed description of the present disclosure given below.

One or more embodiments of a display device include a display panel including a first panel and a second panel, the first panel being located at one side of the second panel in a first direction, a support member configured to support a bottom surface of the display panel and assist in a sliding motion of the display panel in the first direction, and a filling member covered by the first panel and the support member at an end of the first panel in the first direction, wherein the first panel includes a first portion, a second portion, and a third portion, the first portion covering one surface of the support member and be in contact, at least partially, with an other surface of the support member and extending in the first direction, the second portion being at least partially opposing the first portion and extending in a direction opposite the first direction, and the third portion connecting the first portion and the second portion, wherein the support member overlaps the first portion and the third portion, and is in contact with the filling member.

The support member may include a first support part overlapping the first portion, a second support part overlapping the second portion, and a third support part overlapping the third portion, the second support part and the third support part being in contact with the filling member.

The first support part may be in contact, at least partially, with the filling member.

A contact area between the filling member and the first support part may be greater than a contact area between the filling member and the second support part.

The filling member may include a first filling portion in contact with the support member and a second filling portion exposed from the support member, and wherein the second filling portion is covered by the first panel.

The first portion and the second portion of the first panel may be parallel to each other.

The first panel may further include a fourth portion and a fifth portion, the fourth portion being connected to the second portion and covers the second filling portion, the fifth portion being connected to the fourth portion and located opposite to the first portion with the first support part interposed therebetween, and the first portion, the second portion, and the fourth portion extend in different directions from one another.

The fourth portion may extend in a second direction crossing the first direction and has a flat shape.

A display device may further include an adhesive member between the fourth portion and the filling member.

A display device may further include an integrated circuit opposite to the first support part on the fifth portion.

The support member may include a first support part overlapping the first portion, a second support part overlapping the second portion, and a third support part overlapping the third portion, and wherein the third support part includes a first curved portion curved with a first radius of curvature and a second curved portion connected to the first curved portion and curved with a second radius of curvature that is smaller than the first radius of curvature.

The filling member may include a first filling portion in contact with the support member and a second filling portion exposed from the support member and a contact surface between the first filling portion and the first curved portion has a curvature different from that of a contact surface between the first filling portion and the second curved portion.

A curvature of an overlapping portion between the third portion of the first panel and the first curved portion of the third support part may be different from a curvature of an overlapping portion between the third portion of the first panel and the second curved portion.

The first support part and the second support part may be parallel to each other and have a flat shape.

The first panel further may include a fourth portion connected to the second portion and covers the filling member and a fifth portion connected to the fourth portion and opposite to the first portion with the support member interposed therebetween, and the fourth portion extending in a second direction crossing the first direction and has a flat shape.

A display device may further include a cover panel between the first panel and the support member.

The support member may include a first support part overlapping the first portion, a second support part overlapping the second portion, and a third support part overlapping the third portion, and the cover panel covers the first support part and cover at least partially the third support part.

According to one or more embodiments of the present disclosure, a method of manufacturing a display device includes providing a display panel, a support member, and a sliding core, and bending the display panel and the support member by bringing the display panel and the support member in close contact with the sliding core and pressing the display panel and the support member in a first direction.

A method of manufacturing a display device may further include after bending, removing the sliding core and filling a filling member inside the support member A method of manufacturing a display device may further include after filling, applying an adhesive member to a portion where the filling member is exposed, bonding the display panel and the filling member by means of the adhesive member by pressing the display panel in a second direction crossing the first direction.

It should be noted that the effects, aspects, and features of the present disclosure are not limited to those described above, and other effects, aspects, and features of the present disclosure will be apparent from the following description.

BRIEF DESCRIPTION OF THE DRAWINGS

The above and other aspects and features of embodiments of the present disclosure will become more apparent by describing in detail embodiments thereof with reference to the attached drawings, in which.

DETAILED DESCRIPTION

The present disclosure will now be described more fully hereinafter with reference to the accompanying drawings, in which embodiments of the present disclosure are shown. The present disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

Hereinafter, embodiments of the present disclosure will be described with reference to the attached drawings.

Figure 1:
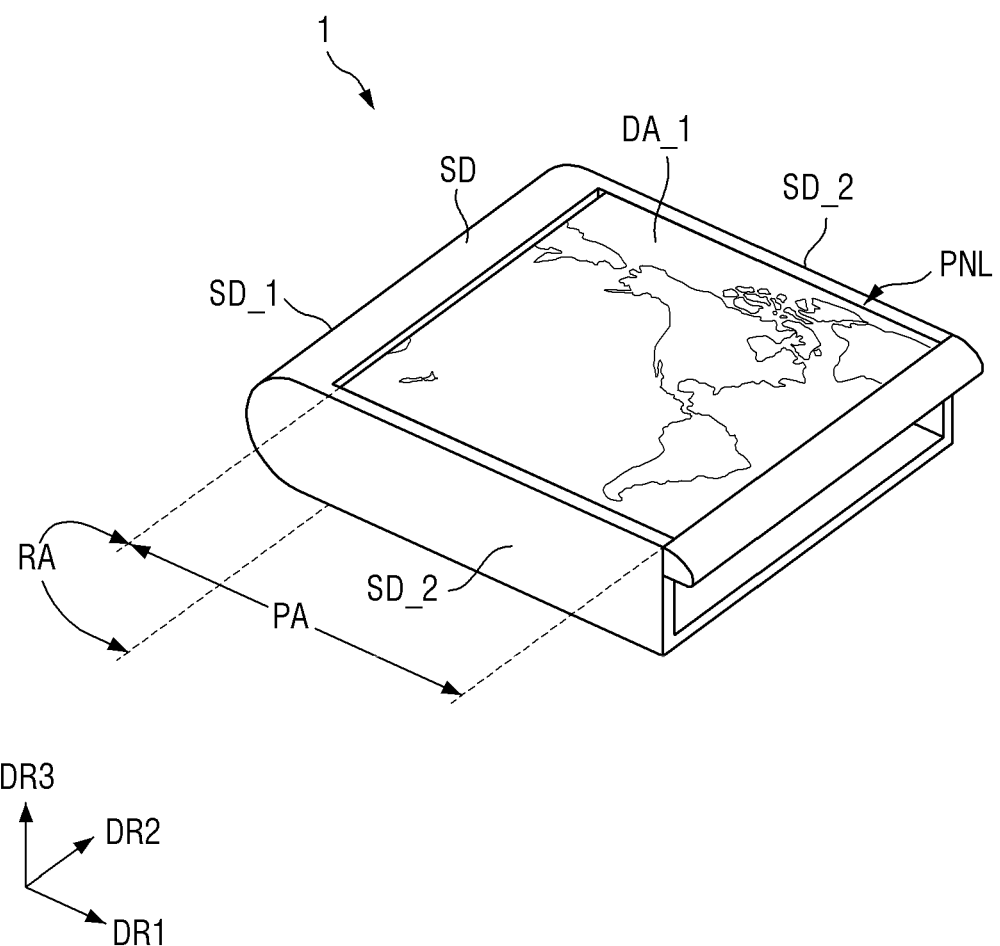
FIG. 1 is a perspective view of a display device according to one or more embodiments.
Figure 2:
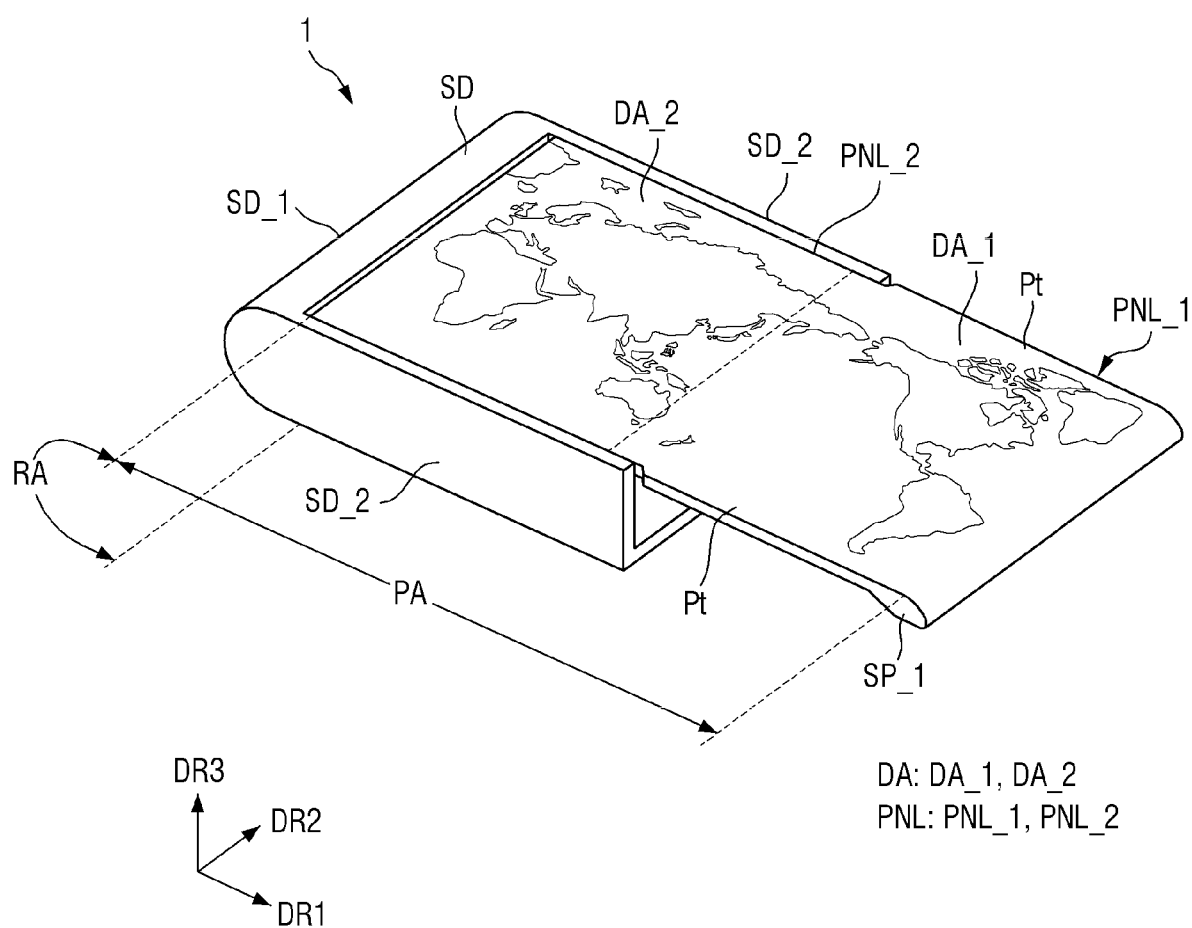
FIG. 2 is a perspective view of the display device of FIG. 1 in an extended state.
Figure 3:
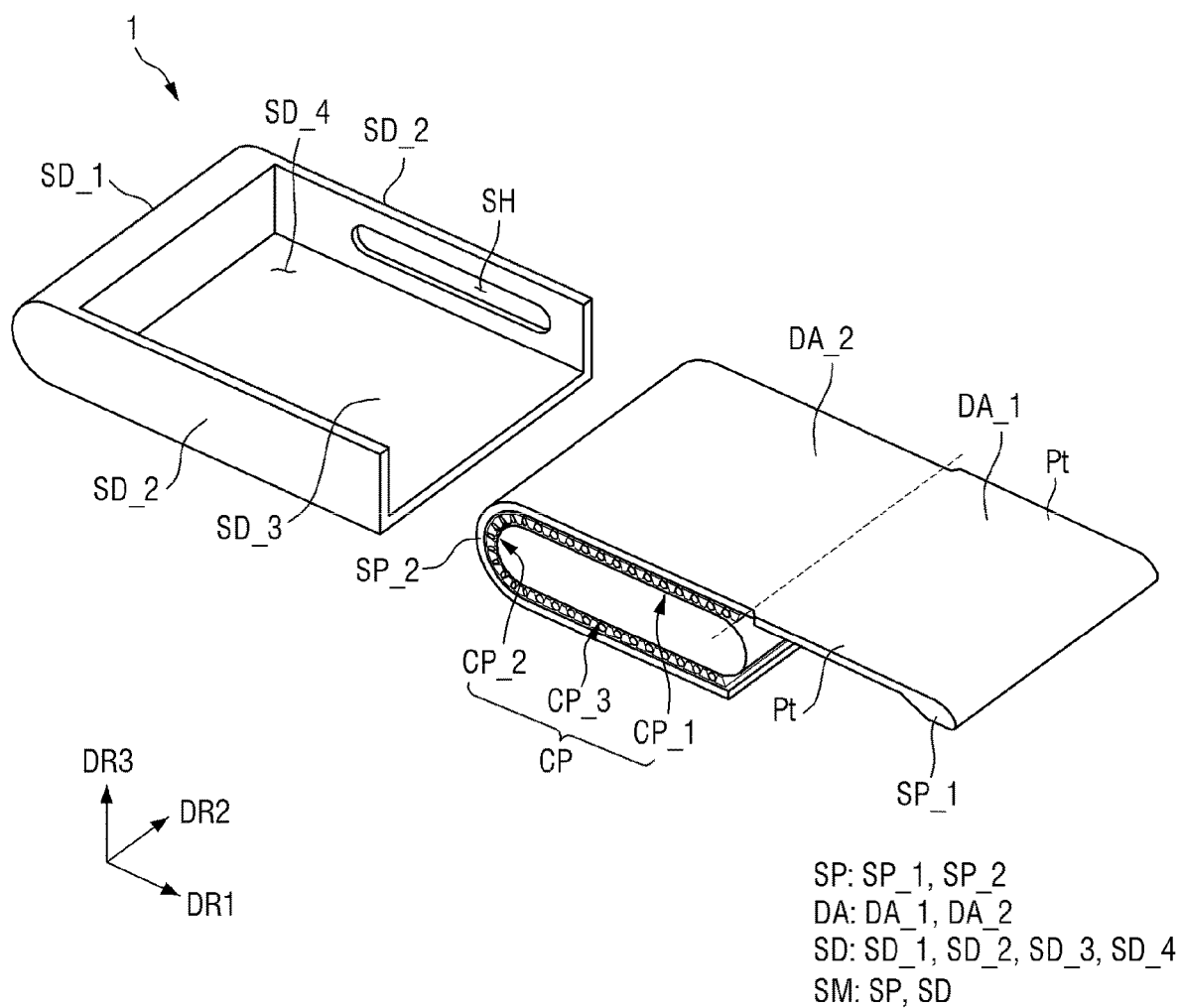
FIG. 3 is an exploded perspective view of the display device of FIG. 1.
Figure 4:
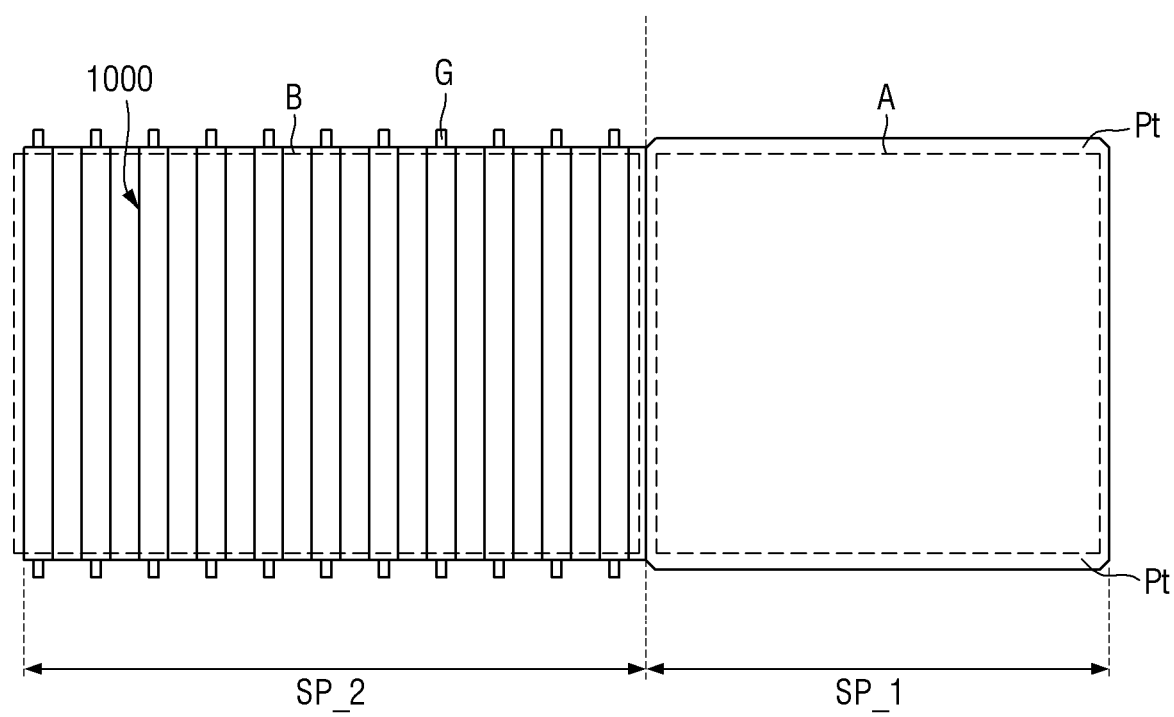
FIG. 4 is a plan view of a support module of FIG. 3 when viewed in a third direction.
Figure 5:
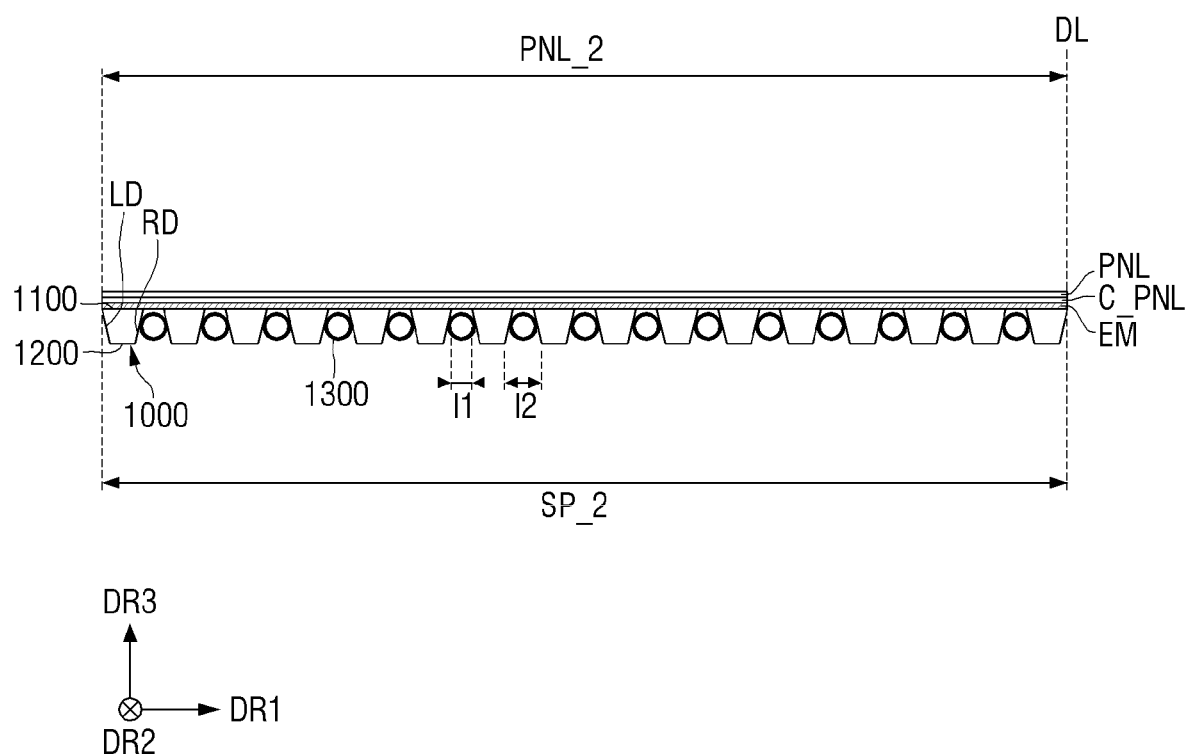
FIG. 5 is a cross-sectional view of a stack structure of a display panel and a second support member of a display device according to one or more embodiments.
Figure 6:
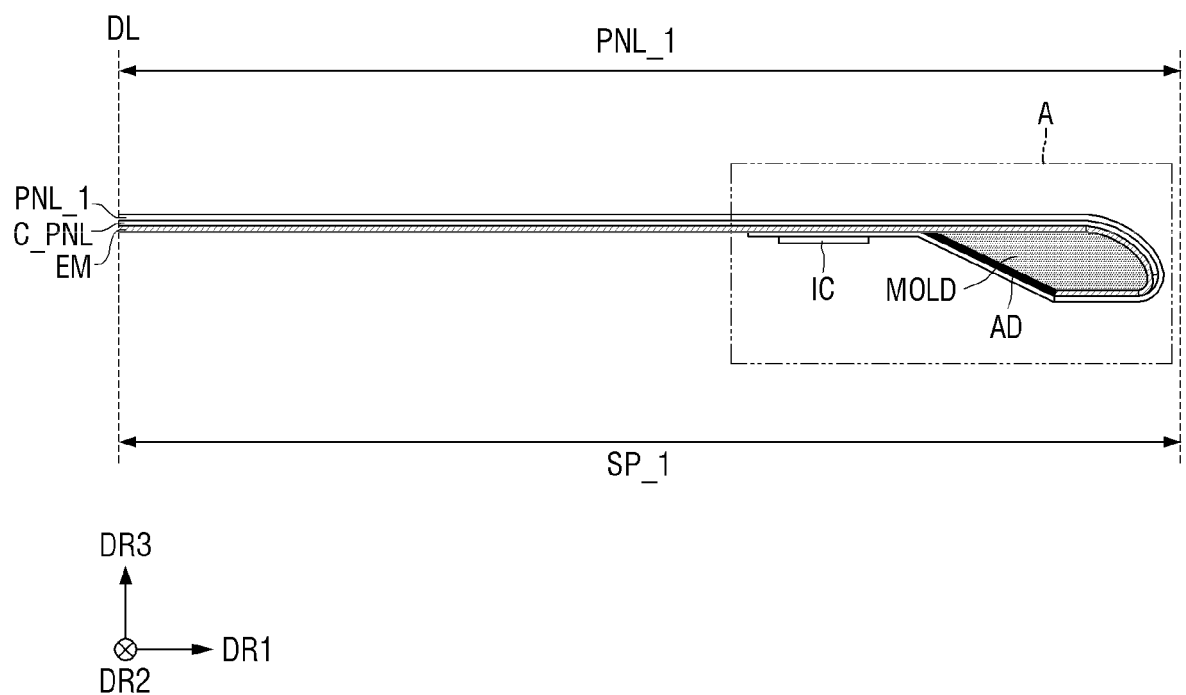
FIG. 6 is a cross-sectional view of a stack structure of a display panel and a first support member of a display device according to one or more embodiments.

FIG. 1 is a perspective view of a display device according to one or more embodiments. FIG. 2 is a perspective view of the display device of FIG. 1 in an extended state. FIG. 3 is an exploded perspective view of the display device of FIG. 1. FIG. 4 is a plan view of a support module of FIG. 3 when viewed in a third direction. FIG. 5 is a cross-sectional view of a stack structure of a display panel and a second support member of a display device according to one or more embodiments. FIG. 6 is a cross-sectional view of a stack structure of a display panel and a first support member of a display device according to one or more embodiments.

Referring to FIGS. 1 and 2, a display device 1 according to one or more embodiments may be a sliding display device or a slidable display device. The display device 1 may be a single slidable device that only slides in one direction, but is not limited thereto. For example, the display device 1 may be a multi-slidable display device that slides in two directions. Hereinafter, a single slidable display device will be mainly described, and a multi-slidable display device will be described further below. The display device 1 may include a display device flat area PA and a display device bent area RA. The display device flat area PA of the display device 1 generally overlaps an area of a display panel exposing portion SD_4 of a panel receiving container SD to be described below. The display device bent area of the display device 1 may be positioned inside the panel receiving container SD. As the display device 1 extends, the area of the display device flat area PA may increase as shown in FIG. 2.

Referring to FIGS. 1 to 5, the display device 1 may include a display panel PNL and a sliding module SM that assists in a sliding motion of the display panel PNL.

Any type of display panel that displays an image may be applied to the display panel PNL of the present embodiment. The display panel may include an organic light emitting display panel including an organic emission layer, a micro light emitting diode (LED) display panel using a micro LED, a quantum dot light emitting display panel that uses a quantum dot light emitting diode including a quantum dot emission layer, and an inorganic light emitting display panel that uses an inorganic light emitting diode including an inorganic semiconductor. Hereinafter, the display device 1 having an organic light emitting display panel as a display panel PNL will be mainly described.

The display panel PNL may be a flexible panel. The display panel PNL may have flexibility to be partially rolled, bent, or curved in the panel receiving container SD of the sliding module, as will be described below.

The display device 1 has a three-dimensional shape. For example, the display device 1 may have a rectangular parallelepiped shape or a shape similar thereto. In the drawings, a direction parallel to a first side (horizontal side) of the display device 1 is referred to as a first direction DR1, a direction parallel to a second side (vertical side) of the display device 1 is referred to as a second direction DR2, and a thickness direction of the display device 1 is referred to as a third direction DR3. As used herein, unless otherwise expressly specified, a "direction" may refer to all directions towards both sides extending along the direction. In addition, when directions extending to each side needs to be distinguished from each other, one side will be referred to as "one side in the direction" and the opposite side will be referred to as "the other side in the direction." Referring to FIG. 1, a direction of an arrow is referred to as one side and a direction opposite thereto is referred to as the other side. The first direction DR1 to the third direction DR3 may be perpendicular to one another. According to the above definitions, the display panel PNL may slide along the first direction DR1. In addition, the display panel PNL may display a screen on a first side of the third direction DR3.

The display panel PNL may include a first panel PNL_1 supported by a first support member SP_1 to be described below and a second panel PNL_2 supported by a second support member SP_2 to be described below. The first panel PNL_1 of the display panel PNL may be a constant flat area that can maintain a flat shape irrespective of a sliding motion. The second panel PNL_2 of the display panel PNL may be a bent area or a bendable area which is rolled, bent, or curved, or which has a rolled, bent, or curved shape and a flat shape changed according to the sliding motion.

A display area DA of the display panel PNL may be divided into a first display area DA_1 and a second display area DA_2 according to whether the display panel PNL slides and the degree of sliding of the display panel PNL. The existence and/or absence and the area of the second display area DA_2 may change according to whether the display panel PNL slides and the degree of sliding. Specifically, in a non-sliding state (hereinafter referred to as a "basic display state"), the display panel PNL has the first display area DA_1 having a first area. In a sliding state, the display device further includes the extended second display area DA_2 in addition to the first display area DA_1.

The second display area DA_2 may be an area in which the second panel PNL_2 of the display panel PNL overlaps the display device flat area PA.

The area of the second display area DA_2 may vary depending on the degree of sliding. When the display device 1 slides to the maximum extent, the second display area DA_2 has a second area, and the display area DA has a third area that is the sum of the first area and the second area. Here, the third area may be the maximum area that the display area DA can have.

The first display area DA_1 may overlap the first panel PNL_1 of the display panel PNL. The second display area DA_2 may overlap at least a portion of the second panel PNL_2 of the display panel PNL. The boundary between the first display area DA_1 and the second display area DA_2 may coincide with the boundary between the first panel PNL_1 and the second panel PNL_2, but is not limited thereto.

The sliding module SM accommodates the display panel PNL and assists in a sliding motion of the display panel PNL. The sliding module SM may include a support module SP coupled to a bottom side of the display panel PNL and the panel receiving container SD for accommodating at least a portion of the display panel PNL.

The support module SP may include a first support member SP_1, a second support member SP_2, and a spacer 1300. The first support member SP_1 and the second support member SP_2 may have substantially the same positional relationship with respect to the display panel PNL. That is, when the display panel PNL is unfolded flat without being bent, a plane parallel to the display panel PNL may pass at least in part through the first support member SP_1 and the second support member SP_2 concurrently (e.g., simultaneously).

Each of the first support member SP_1 and the second support member SP_2 may be formed of a material having suitable rigidity to support the display panel PNL, and may be made of, for example, metal or the like. However, the present disclosure is not limited thereto, and the first support member SP_1 and the second support member SP_2 may be made of a material other than metal. The first support member SP_1 and the second support member SP_2 may be made of the same material, or may be made of different materials.

The first support member SP_1 is disposed on one side of the second support member SP_2 in the first direction DR1.

The first support member SP_1 may substantially have a plate shape in a plan view.

The first support member SP_1 includes a main area A that overlaps the first panel PNL_1 of the display panel PNL.

The first support member SP_1 may further include protrusion areas Pt each of which protrudes from the first panel PNL_1 of the display panel PNL to each side in the second direction DR2. The protrusion areas Pt are engaged with sidewalls SD_2 on lateral surfaces of the panel receiving container SD to be described below and may serve to guide the display panel PNL to slide. The protrusion area Pt may be thinner than the main area A, but is not limited thereto.

The second support member SP_2 is located on the other side of the first support member SP_1 in the first direction DR1, and overlaps the second panel PNL_2 of the display panel PNL in area B shown in FIG. 4. The second support member SP_2 may be physically separated from the first support member SP_1 and may be spaced from the first support member SP_1.

The second support member SP_2 may include a plurality of joints 1000 and the spacers 1300 disposed between the joints 1000. Each joint 1000 may have a shape extending in the second direction DR2. As shown in FIG. 5, each joint 1000 may have a trapezoidal shape whose cross-section has a width narrowing toward the other side of the third direction DR3. The plurality of joints 1000 may have the same shape and size, but are not limited thereto.

The plurality of joints 1000 of the second support member SP_2 may further include guide protrusions G protruding from both ends in the second direction DR2. The guide protrusions G may protrude from the first panel PNL_1 of the display panel PNL to both sides in the second direction DR2 in a plan view.

Like the protrusion areas Pt of the first support member SP_1, the guide protrusions G are engaged with the sidewalls SD_2 on the lateral surfaces of the panel receiving container SD and may serve to guide the display panel PNL to slide. The length that the guide protrusions G protrude in the second direction DR2 from an edge of the display panel PNL may be substantially the same as the length that the protrusion areas Pt protrude in the second direction DR2 from the edge of the display panel PNL.

The plurality of joints 1000 may be arranged along the first direction DR1. Adjacent joints 1000 may be spaced from each other at a suitable interval (e.g., a predetermined interval). The spacer 1300 may be disposed in a space between each pair of adjacent joints 1000 of the second support member SP_2. A distance between the adjacent joints 1000 and the spacer 1300 will be described in greater detail below.

The support module SP may include a metal member EM. The metal member EM may be disposed and fixed onto a bottom surface of the display panel PNL and may serve to alleviate stress applied to the display panel PNL. In addition, the metal member EM may serve to absorb the impact exerted upon the display panel PNL.

The metal member EM may be disposed across the first support member SP_1 and the second support member SP_2 in a plan view. The metal member EM may be continuously disposed regardless of the plurality of joints 1000 of the second support member SP2 and the spacing between the plurality of joints 1000. The metal member EM may have substantially the same shape as the planar shape of the display panel PNL.

The metal member EM may overlap the entire display panel PNL. When the display panel PNL is bent, the metal member EM may be bent along with the display panel PNL. When the metal member EM is bent along with the display panel PNL, the metal member EM may absorb stress generated as the second support member SP_2 is bent and thereby alleviate the stress applied to the display panel PNL.

The plurality of joints 1000 of the second support member SP_2 may each include a first surface attached to the metal member and a second surface opposite to the first surface. A movement of the first surface of the joint 1000 attached to the metal member is restricted by the second adhesive member. Because the second surface of each joint 1000 is far away from the second adhesive member, the second surface may move relatively freely compared to the first surface. Hereinafter, for convenience of description, the first surface of the joint 1000 attached to the metal member will be referred to as a fixed end 1100 and the second surface opposite the first side will be referred to as a free end 1200.

The free end 1200 of the joint 1000 may have a shorter length (or width) compared to the fixed end 1100. Each of the plurality of joints 1000 may include an inclined surface that connects the free end 1200 and the fixed end 1100. The inclined surface may include a left inclined plane positioned on the other side in the first direction DR1 and a right inclined plane positioned on one side in the first direction DR1. That is, as shown in FIG. 5, the cross-section of each of the plurality of joints 1000 may have a trapezoidal shape that includes the fixed end 1100, the free end 1200, the left inclined plane, and the right inclined plane and has a width narrowing toward the other side in the third direction DR3. Although FIG. 5 illustrates that the cross-section of the joint 1000 has an isosceles trapezoidal shape in which the left incline plane and the right inclined plane have the same length, the cross-sectional shape of the joint 1000 is not limited to the illustrated shape and may be of any shape as long as the shape has a width narrowing toward the other side in the third direction DR3.

The adjacent joints 1000 may be spaced from each other and disposed at regular intervals. The fixed ends 1100 of the adjacent joints 1000 may be spaced from each other on the second adhesive member and disposed at regular intervals. Pairs of adjacent joints 1000 may each have a regular fixed-end interval 11 defined as a distance from one fixed end 1100 to an adjacent fixed end 1100 and a regular free-end interval 12 defined as a distance from one free end 1200 to an adjacent free end 1200. The free-end interval 12 in a basic display state of the display device 1 is greater than the fixed-end interval 11.

When the joints 1000 have a desired fixed-end interval (e.g., a predetermined fixed-end interval) 11, the motion range of the joints 1000 may be increased. If the fixed ends 1100 of the plurality of joints 1000 are in contact with one another, the free-end interval 12 may exist while there will be no fixed-end interval 11. In this case, during the sliding motion of the display device 1, not only the range of motion of the joints 1000 is limited, but also strong local tensile stress is generated in a region of the display panel PNL overlapping the contacting portions of the fixed ends 1100 that may cause defects in the display panel PNL. Also, when the distances between adjacent joints 1000 are not constant, the stress applied by the fixed-end intervals 11 between adjacent joints 1000 varies, leading to non-uniformity of display quality of the display panel PNL. When the plurality of joints 1000 are spaced from each other and arranged at regular intervals, the above-described defects may be prevented or reduced.

The panel receiving container SD serves to accommodate the display panel PNL and at least a portion of the support module SP.

The panel receiving container SD includes a lower surface SD_3 and sidewalls SD_1 and SD_2. The lower surface SD_3 of the panel storage container SD forms a lower surface or a bottom surface of the panel receiving container SD. The sidewalls SD_1 and SD_2 extend from the edge of the lower surface SD_3 to one side in the third direction DR3. In one or more embodiments, the sidewalls SD_1 and SD_2 may be integrally formed with the lower surface SD_3 to have a shape bent in a vertical direction from the lower surface SD_3, but the present disclosure is not limited thereto.

The sidewalls SD_1 and SD_2 may include a rear sidewall SD_1 located on an edge of the lower surface SD_3 on the other side in the first direction DR1 (one vertical side extending parallel to the second direction DR2) and a pair of lateral sidewalls SD_2 located on both edges of the lower surface SD_3 on both sides in the second direction DR2 (both horizontal sides extending parallel to the first direction DR1). The rear sidewall SD_1 and the lateral sidewalls SD_2 may be integrally formed, but the present disclosure is not limited thereto.

The sidewall may not be disposed on an edge of the lower surface SD_3 on one side in the first direction DR1. That is, an open space is provided on the edge of the lower surface SD_3, and through the open space, a movement space of the display panel PNL may be secured.

The panel receiving container SD may include a display panel exposure part SD_4 whose top surface is open in the third direction DR3. The display area DA of the display panel PNL accommodated in the panel receiving container SD may be exposed through the display panel exposure part SD_4 to be visually recognized by a user. The display panel exposure part SD_4 may be defined as an area between the rear sidewall SD_1 and the lateral sidewalls SD_2.

As described above, the panel receiving container SD may include an empty space surrounded by the rear sidewall SD_1, the lateral side sidewalls SD_2, and the lower surface SD_3. The display panel PNL, a portion of the support module SP, and even a panel driving module CP, which will be described below, may be disposed in the empty space formed in the panel receiving container SD and accommodated in the panel receiving container SD.

Each of the pair of lateral sidewalls SD_2 of the panel receiving container SD may include a sliding groove SH disposed on the inner surface thereof. The protrusion areas Pt of the first support member SP_1 and the guide protrusions G of the second support member SP_2 may be engaged with the sliding grooves SH of the panel receiving container SD. When the display panel PNL slides on the panel driving module CP to one side in the first direction DR1 or the other side in the first direction DR1, the first support member SP_1 or the second support member SP_2 slides along the trajectory formed by the sliding grooves SH and accordingly, the sliding motion of the display panel PNL may be guided. Although the drawing illustrates that one side of the sliding groove SH is covered by the lateral side wall SD_2, the sliding groove SH may be replaced with a sliding hole penetrating through the lateral side wall SD_2 in the second direction DR2.

The display device 1 may further include a panel driving module CP configured to drive the display panel PNL. The panel driving module CP may provide a display driving signal to the display panel PNL and supply power to the display device 1. The panel driving module CP may include a hardware assembly in which panel driving components such as a circuit board to which the display panel PNL provides a signal, a battery pack, and the like are packaged together.

The panel driving module CP may have a three-dimensional shape in which both side surfaces in the first direction DR1 may be convex and the remaining surfaces may be flat. Specifically, the panel driving module CP may include a front part CP_1 having a flat surface and disposed on one side in the third direction DR3, a rear part CP_3 having a flat surface and disposed on the other side in the third direction DR3, and a connection part CP_2 connecting the front part CP_1 and the rear part CP_3. The connection part CP_2 positioned on the other side of the panel driving module CP in the first direction DR1 may have a curved surface convex toward the other side in the first direction DR1, and the connection part CP_2 disposed on one side of the panel driving module CP in the first direction DR1 may have a curved surface convex toward one side in the first direction DR1.

The panel driving module CP may be accommodated in the panel receiving container SD by being surrounded by the rear sidewall SD_1, the lateral sidewalls SD_2, and the lower sidewall SD_3 of the panel receiving container SD in a state in which the front part CP_1, the rear part CP_3, and the connection part CP_2 are surrounded by the display panel PNL.

For example, when the panel driving module CP is accommodated in the panel receiving container SD, the panel receiving container SD and the panel driving module CP do not make completely close contact with each other, and a suitable interval or suitable space (e.g., a predetermined interval or space) may be formed therebetween. That is, the rear sidewall SD_1 of the panel receiving container SD and the connection part CP_2 of the panel driving module CP may face each other with a predetermined distance or space interposed therebetween. In addition, the lower surface SD_3 of the panel receiving container SD and the rear part CP_3 of the panel driving module CP may face each other with the suitable space (e.g., the predetermined interval or space) interposed therebetween, and the front part CP_1 of the panel driving module CP may face the display panel exposure part SD_4 of the panel receiving container SD. At least a portion of the display panel PNL and at least a portion of the support module SP may be accommodated in a space formed between the panel receiving container SD and the panel driving module CP.

The display panel PNL and the support module SP may be disposed, at least in part, on the panel driving module CP. For example, the display panel PNL and the support module SP may be mounted on the panel driving module CP in such a manner that they can slide to both sides in the first direction DR1, and may be selectively accommodated in the panel receiving container SD by moving along the connection part CP_2, the rear part CP_3, and the front part CP_1 of the panel driving module CP. That is, as shown in FIG. 3, when accommodated in the panel receiving container SD, the display panel PNL and the support module SP may surround the front part CP_1, the connection part CP_2, and the rear part CP_3 of the panel driving module CP.

The sliding grooves SH formed on the lateral sidewalls SD_2 of the panel receiving container SD may form a trajectory corresponding to the shape of the panel driving module CP as shown in FIG. 3 when the display device 1 is viewed from the second direction DR2. Accordingly, the display panel PNL may slide along the trajectory that corresponds to the shape of the panel driving module CP. Hereinafter, the sliding motion of the display panel PNL, support of the support module SP to the display panel PNL, and an image display method will be described in more detail with focus on the mounting relationship between the panel receiving container SD and the support module SP.

As shown in FIG. 1, when the display device 1 is in a basic display state, only the first panel PNL_1 of the display panel PNL may be exposed through the display panel exposure part SD_4 and an image may be displayed on the first display area DA_1 (i.e., the first panel PNL_1) that corresponds to the first panel PNL_1. In this case, the first support member SP_1 may support a lower portion of the display panel PNL on the front part CP_1 of the panel driving module CP and the second support member SP_2 may support the lower portion of the display panel PNL on the connection part CP_2 of the panel driving module CP. That is, the second support member SP_2 including the arranged joints 1000 may be deformed to conform to the shape (curved surface convex toward the other side in the first direction DR1) of the connection part CP_2. When the display panel PNL is not extended, the panel receiving container SD may store therein the second panel PNL_2 of the display panel PNL.

As shown in FIG. 2, when the sliding motion is performed, the display panel PNL may slide to one side in the first direction DR1 on the panel receiving container SD with the support of the first support member SP_1. As a result, the display device 1 may be extended to one side in the first direction DR1. In this case, at least a portion of the second panel PNL_2 of the display panel PNL may be moved to be positioned between the front part CP_1 of the panel driving module CP and the display panel exposure part SD_4 of the panel receiving container SD, and not only the first display area DA_1 (i.e., PNL_1) but also the second panel PNL_2 of the display panel PNL may be exposed to the outside by the display panel exposure part SD_4. In the sliding state as described above, the display device 1 may display an image through the first display area DA_1 and the second display area DA_2. In this case, the first support member SP_1 may support a lower portion of the first panel PNL_1 of the display panel PNL outside the panel receiving container SD, and the second support member SP_2 may support the lower portion of the second panel PNL_2 of the display panel PNL on the front part CP_1 and the connection part CP_2 of the panel driving module CP.

Figure 7:
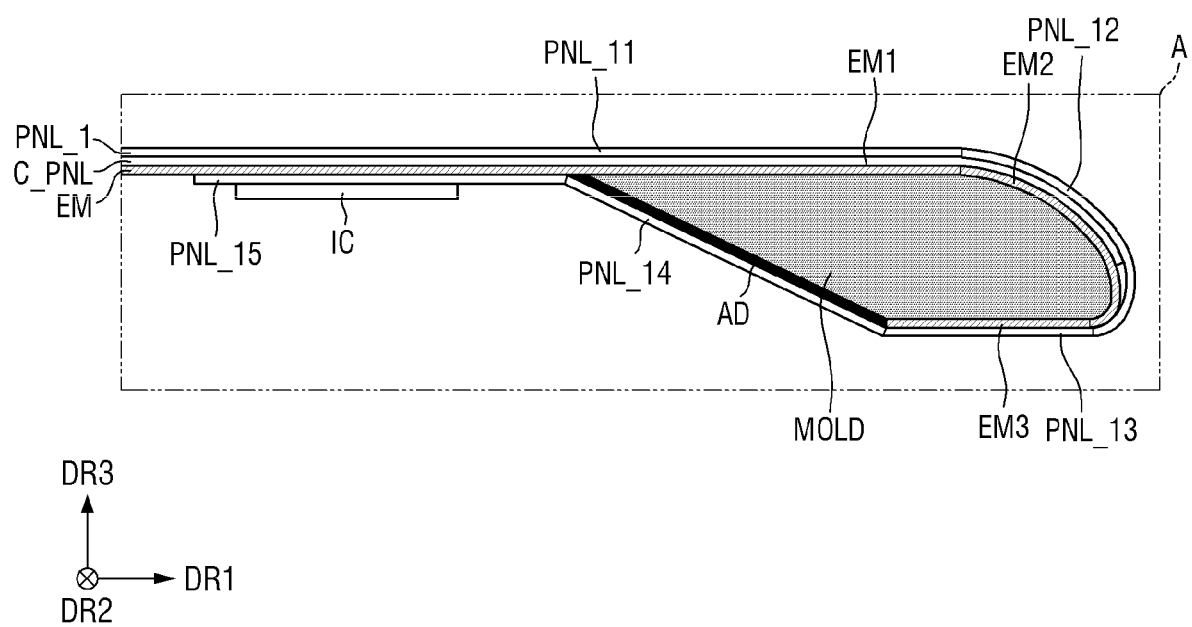
FIG. 7 is an enlarged view of a portion A of FIG. 6.

FIG. 7 is an enlarged view of portion A of FIG. 6.

Referring to FIG. 7, an end in the first direction of the first panel PNL_1 of the display panel PNL has a bent or curved shape. The first panel PNL_1 and the metal member EM may extend along one side in the first direction DR1, be bent or curved in a direction between one end in the first direction DR1 and the other end in the third direction, and then extend toward the other side in the first direction DR1.

More specifically, the first panel PNL_1 includes a first portion PNL_11 having a flat shape and extending along the first direction DR1, a second portion PNL_12 connected to the first portion PNL_11 and curved with a curvature in a direction between one side in the first direction DR1 and the other side in the third direction, a third portion PNL_13 that is connected to the second portion PNL_12, extends to the other side in the first direction DR1, is parallel to the first portion PNL_11, and has a flat shape, a fourth portion PNL_14 that is connected to the third portion PNL_13, extends in a direction between the other side in the first direction DR1 and one side in the third direction, and has a flat shape, and a fifth portion PNL_15 that is connected to the fourth portion PNL_14, extends to the other side in the first direction DR1 and has a flat shape.

The metal member EM includes a first support part EM1 overlapping the first portion PNL_11 and extending along the first direction DR1, a second support part EM2 connected to the first support part EM1, overlapping the second portion PNL_12, and curved with a curvature in a direction between one side in the first direction DR1 and the other side in the third direction, and a third support part EM3 connected to the second support part EM2, overlapping the third portion PNL_13, extending to the other side in the first direction DR1, being parallel to the first portion PNL_11, and having a flat shape. The first support part EM1, the second support part EM2, and the third support part EM3 are positioned within the first portion PNL_11, the second portion PNL_12, and the third portion PNL_13, respectively.

A filling member MOLD is disposed in an inner space defined by the first panel PNL_1. That is, the filling member MOLD may come into direct contact with the first to third support parts EM1 to EM3 in the inner space defined by the first to fourth portions PNL_11 to PNL_14. An adhesive member AD may be further disposed between the fourth portion PNL_14 and the filling member MOLD. The adhesive member AD may serve to adhere the first panel PNL_1 and the filling member MOLD to each other. The metal member EM may not be disposed between the fourth portion PNL_14 and the filling member MOLD. That is, the first to third support parts EM1 to EM3 may be, respectively, disposed between the first to third portions PNL_11 to PNL_13 and the filling member MOLD, while the metal member EM is not disposed between the fourth portion PNL_14 and the filling member MOLD. The filling member MOLD may include various molding materials known in the art. The filling member MOLD is defined by the first support part EM1, the second support part EM2, the third support part EM3, and the fourth portion PNL_14, and the shape of the filling member MOLD may be substantially the same as the shape formed by the inner side surfaces of the first support part EM1, the second support part EM2, the third support part EM3, and the fourth portion PNL_14. In other words, one surface of the filling member MOLD in the third direction has a flat shape, one surface of the filling member MOLD in the first direction DR1 has a bent or curved shape protruding toward one side in the first direction DR1, the other surface of the filling member MOLD in the third direction has a flat shape, and the other surface of the filling member MOLD in the first direction DR1 may have a flat shape.

The fifth portion PNL_15 may be in direct contact with the first support part EM1 of the metal member EM. That is, the first portion PNL_11 may be disposed on one side of the first support part EM1 in the third direction and the fifth portion PNL_15 may be disposed on the other side of the first support part EM1 in the third direction. An integrated circuit (IC) is disposed on a surface of the fifth portion PNL_15 on the other side in the third direction. The IC may include various elements known in the art.

A cover panel C_PNL may be disposed between the first panel PNL_1 and the metal member EM. The cover panel C_PNL may be attached to the lower portion of the display panel PNL and have a variety of functionality, such as a cushioning ability to protect the display panel PNL from external impact, a heat dissipation ability to discharge heat generated by the display panel PNL to the outside, an electromagnetic wave shielding ability, a grounding function, a digitizing function, and the like.

By configuring an end of the display panel PNL on one side in the first direction DR1 as shown in the drawing, a spring back effect of metal may be diminished or eliminated and damage to the panel due to compression of curved surfaces may be prevented. In addition, by filling the inside of the metal member EM with the filling member MOLD, rigidity may be achieved and the shape may be easily maintained. Moreover, the molding material included in the filling member MOLD also has a shockproof ability, and thus it can absorb external impact to prevent damage to the panel. Further, by filling the inside of the display panel PNL and the metal member EM with the filling member MOLD, variation in shape for each product may be alleviated.

FIGS. 8 to 11 are cross-sectional views of the stages of a method of manufacturing a display device according to one or more embodiments.

Referring to FIGS. 8 to 11, a method of manufacturing a display device 1 according to one or more embodiments includes providing a display panel PNL, a metal member EM, and a sliding core, bending the display panel PNL and the metal member by bringing the display panel PNL and the metal member EM into close contact with the sliding core and pressing the display panel PNL and the metal member EM in the first direction DR1, removing the sliding core and filling the inside of the metal member with a filling member MOLD, applying an adhesive member to a portion where the filling member MOLD is exposed, and bonding the display panel PNL and the filling member MOLD by means of the adhesive member AD by pressing the display panel PNL in the second direction DR2 that crosses the first direction DR1.

Figure 8:
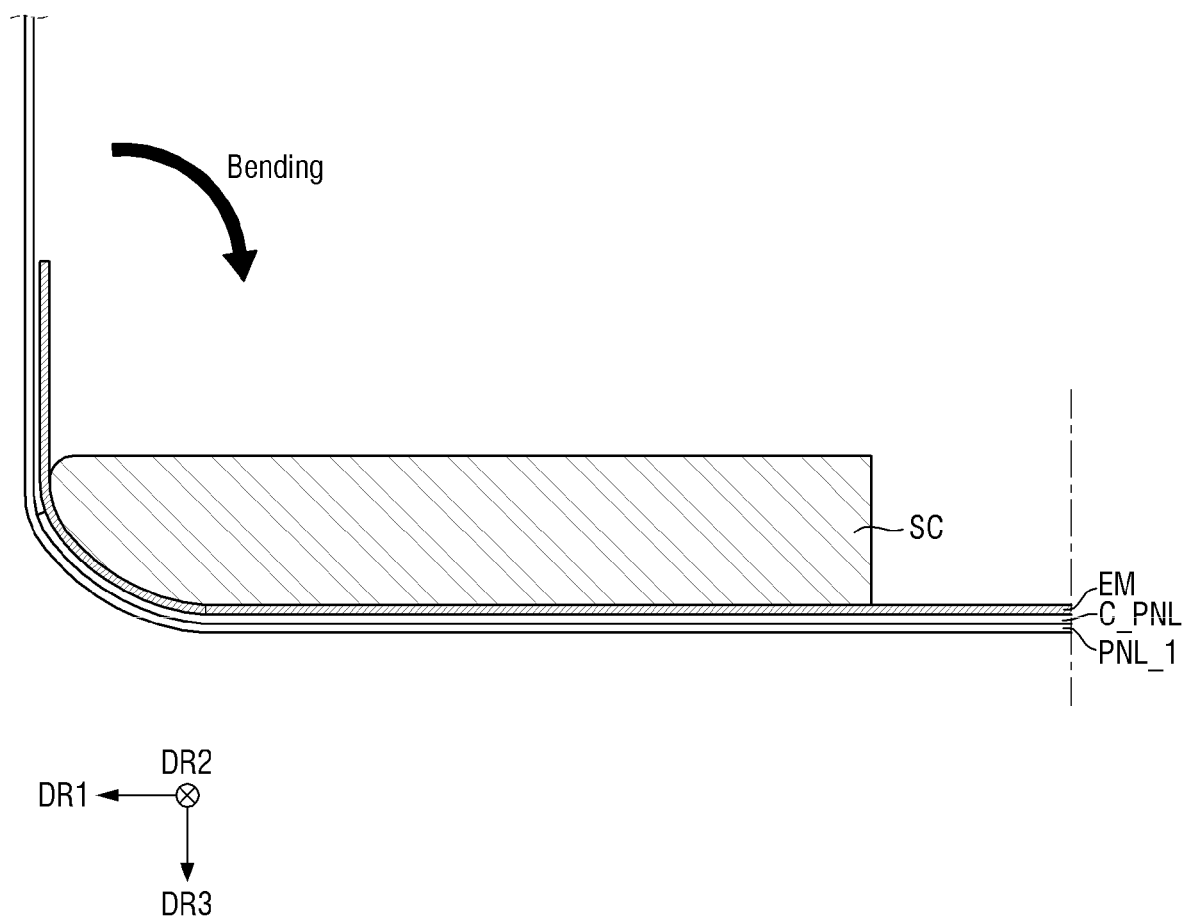
FIGS. 8 to 11 are cross-sectional views of the stages of a method of manufacturing a display device according to one or more embodiments.
Figure 9:
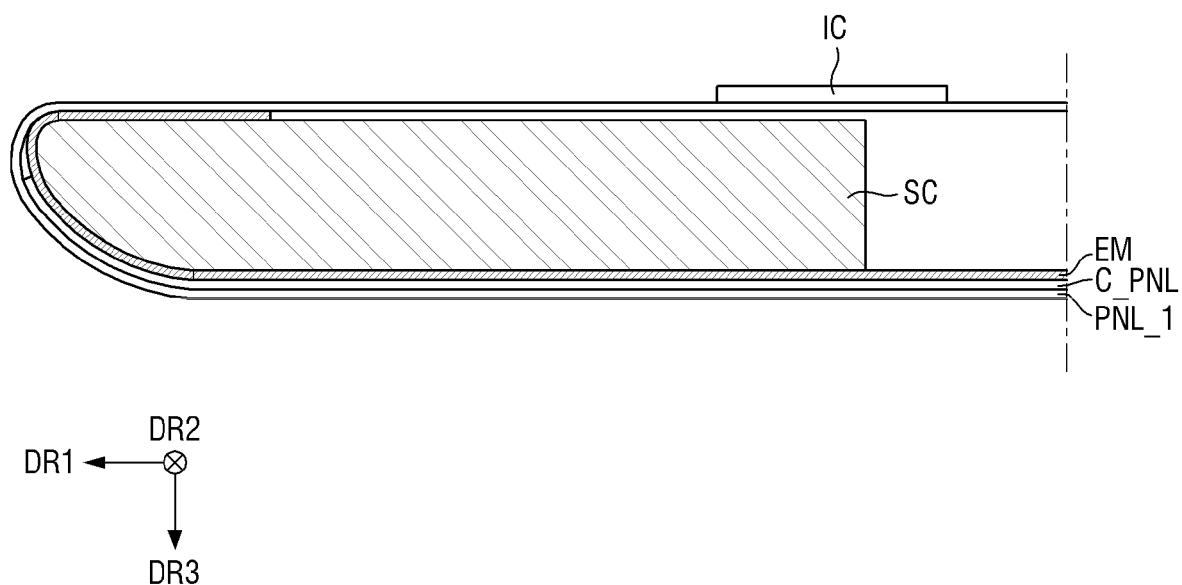

Referring to FIGS. 8 and 9, the display panel PNL and the metal member EM in operation of providing the display panel PNL, the metal member EM, and the sliding core may be substantially the same as the display panel PNL and the metal member EM shown in FIGS. 1 to 7 except for the shapes. The sliding core may be a sliding core known in the art. In the bending of the display panel PNL and the metal member EM, a first curvature may be implemented by pressing the display panel PNL and the metal member EM and then a second curvature may be implemented by bringing the display panel PNL and the metal member EM into close contact with the sliding core and pressing them. More specifically, the display panel PNL and the metal member EM may be disposed to be in close contact with one side of the sliding core in the third direction and one side of the sliding core in the first direction DR1. The display panel PNL and the metal member EM may be bent by pressing portions of the display panel PNL and the metal member EM extending to the other side in the third direction outside the sliding core toward the other side in the first direction DR1. Once the pressing is completed, inner side surfaces of the display panel PNL and the metal member EM may have at least partially the same shape as outer side surfaces of the sliding core.

Figure 10:
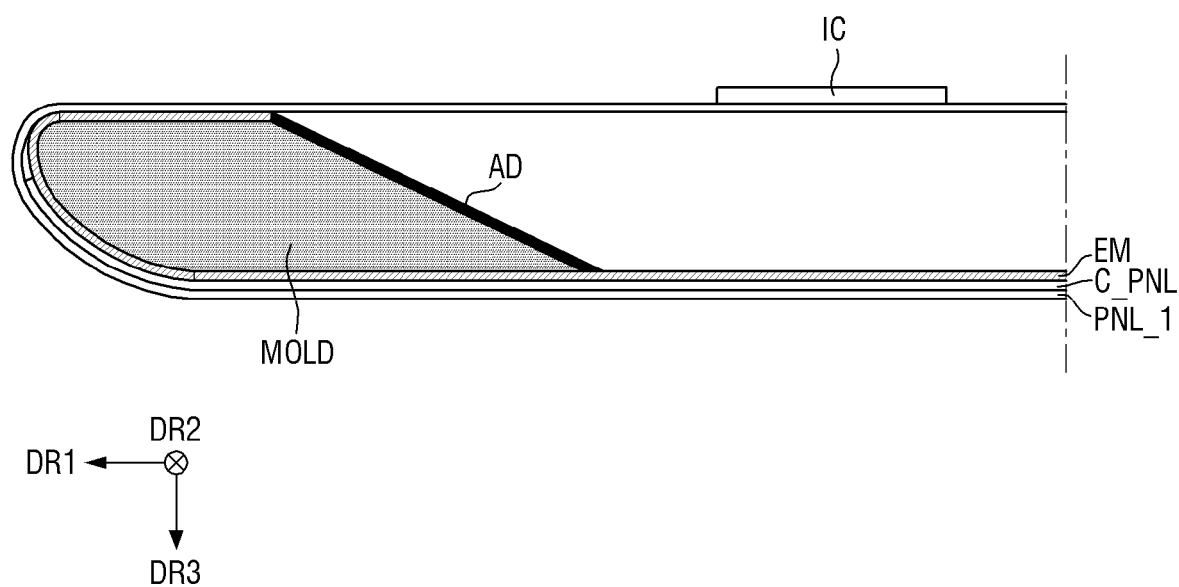

Referring to FIG. 10, in the removing of the sliding core and the filling inside of the metal member EM with the filling member MOLD, the sliding core is removed and the filling member MOLD is filled in a portion of a space from which the sliding core is removed. The filling member MOLD may be a molding material known in the art, and the filling member MOLD may be filled through molding. When the filling member MOLD is hardened, the adhesive member AD may be applied to the portion of the filling member MOLD that is exposed to the outside without being covered by the metal member EM.

Figure 11:
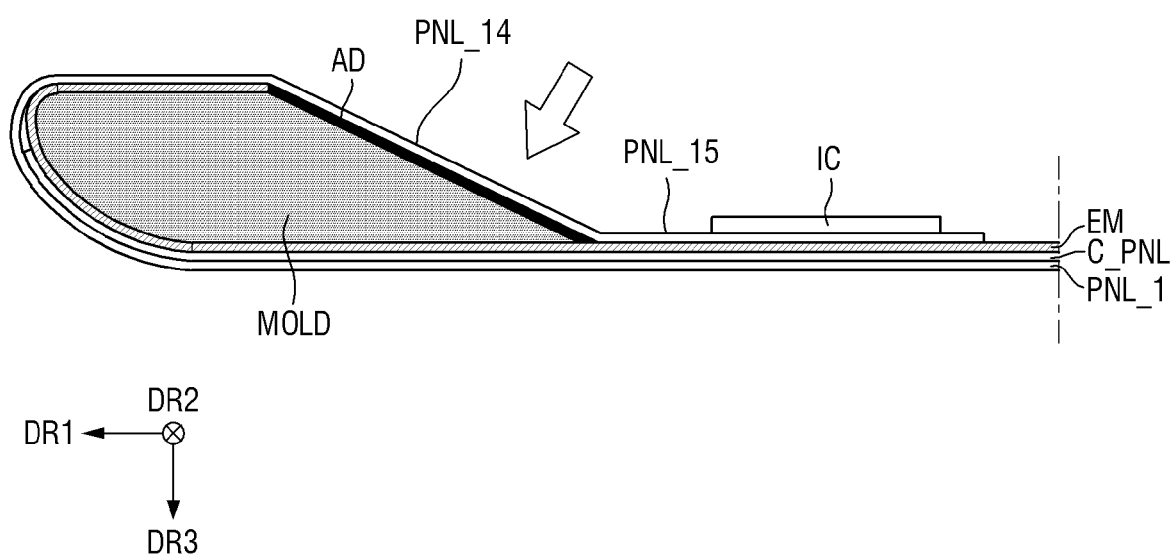

Referring to FIG. 11, in the bonding of the display panel PNL and the filling member MOLD, a fourth portion PNL_14 (e.g., see FIG. 7) of the display panel PNL may be bonded to the filling member MOLD by means of the adhesive member AD by pressing the fourth portion PNL_14 and a fifth portion PNL_15 (e.g., see FIG. 7) of the display panel PNL. Accordingly, the exposed portion of the filling member MOLD may be covered by the fourth portion PNL_14 of the display panel PNL and the fifth portion PNL_15 comes into contact with the metal member EM.

Figure 12:
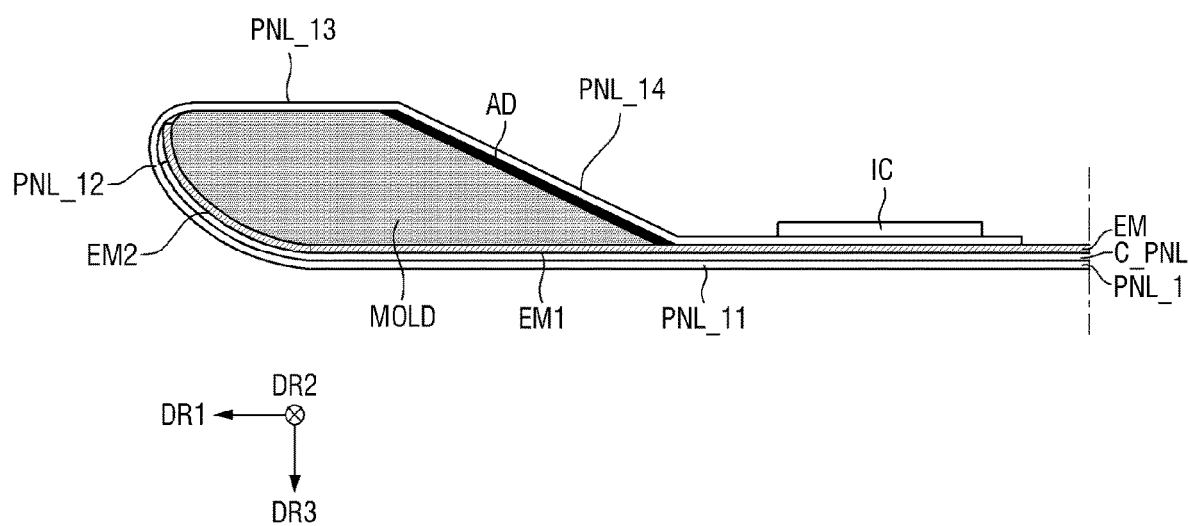
FIG. 12 is a cross-sectional view of a stack structure of a display panel and a first support member of a display device according to one or more embodiments.

FIG. 12 is a cross-sectional view of a stack structure of a display panel and a first support member of a display device according to one or more embodiments.

A display device 1 according to the present embodiment is different from the embodiment of FIG. 7 in that a metal member EM does not include a third support part EM3. The following description focuses primarily on differences from the embodiment of FIG. 7.

Referring to FIG. 12, a metal member EM includes a first support part EM1 and a second support part EM2. Thus, a surface of a filling member MOLD on the other side in the third direction is not covered by the metal member EM. Accordingly, the surface of the filling member MOLD on the other side in the third direction may make direct contact with a first panel PNL_1 of the display panel PNL as may a surface on the other side in the first direction DR1. That is, the first support part EM1 and the second support part EM2 of the metal member EM are disposed between first and second portions PNL_11 and PNL_12 and the filling member MOLD, while the metal member EM is not disposed between third and fourth portions PNL_13 and PNL_14 and the filling member MOLD. Accordingly, the resulting display device 1 may be reduced in weight by the weight of the third support part EM3. Also, the thickness of the display device 1 may be reduced.

Figure 13:
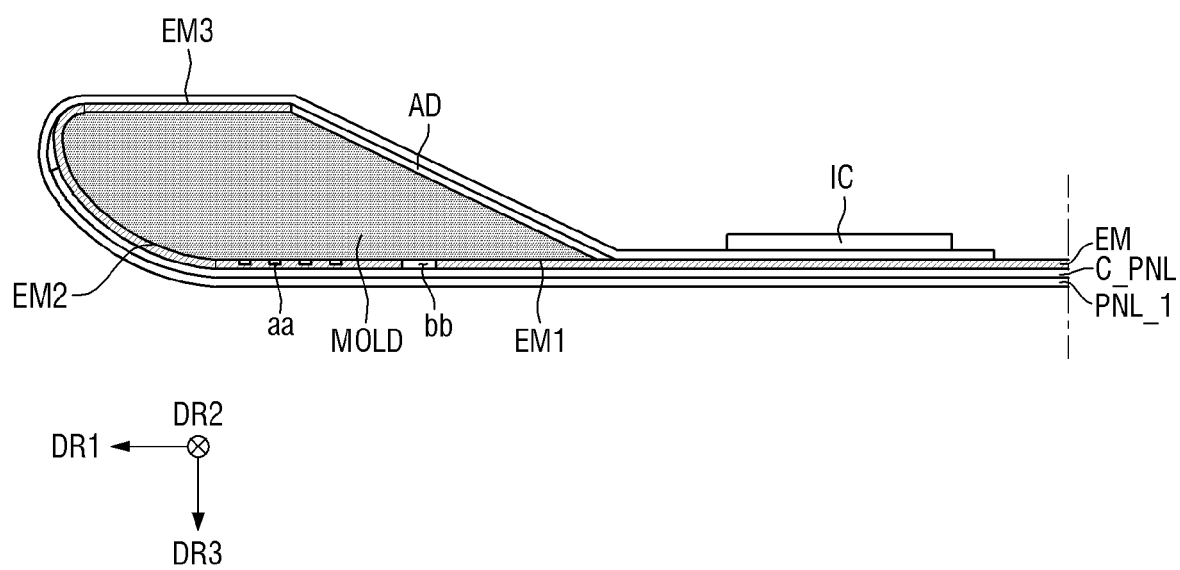
FIG. 13 is a cross-sectional view of a stack structure of a display panel and a first support member of a display device according to one or more embodiments.

FIG. 13 is a cross-sectional view of a stack structure of a display panel and a first support member of a display device according to one or more embodiments.

A display device 1 according to the present embodiment is different from the embodiment of FIG. 7 in that an engraved pattern portion aa and a through portion bb are included.

Referring to FIG. 13, a metal member EM may include an engraved pattern portion aa and a through portion bb. More specifically, a first support part EM1 of the metal member EM may include the engraved pattern portion aa including a plurality of engraved patterns and the through portion bb having a shape of partially passing through the first support part EM1. As the first support part EM1 includes the engraved pattern portion aa and the through portion bb, the contact area between the filling member MOLD and the first support part EM1 may increase and the bonding strength between the filling member MOLD and the metal member EM may increase. That is, the filling member MOLD may be more firmly fixed inside the metal member EM. Although the first support part EM1 is illustrated as including the engraved pattern portion aa and the through portion bb, the present disclosure is not limited thereto. For example, not only the first support part EM1 but also a second support part EM2 and a third support part EM3 may include the engraved pattern portion aa or the through portion bb. In addition, the engraved pattern portion aa and the through portion bb may be disposed in various shapes, such as an island shape, a line shape, and the like in a plan view.

Figure 14:
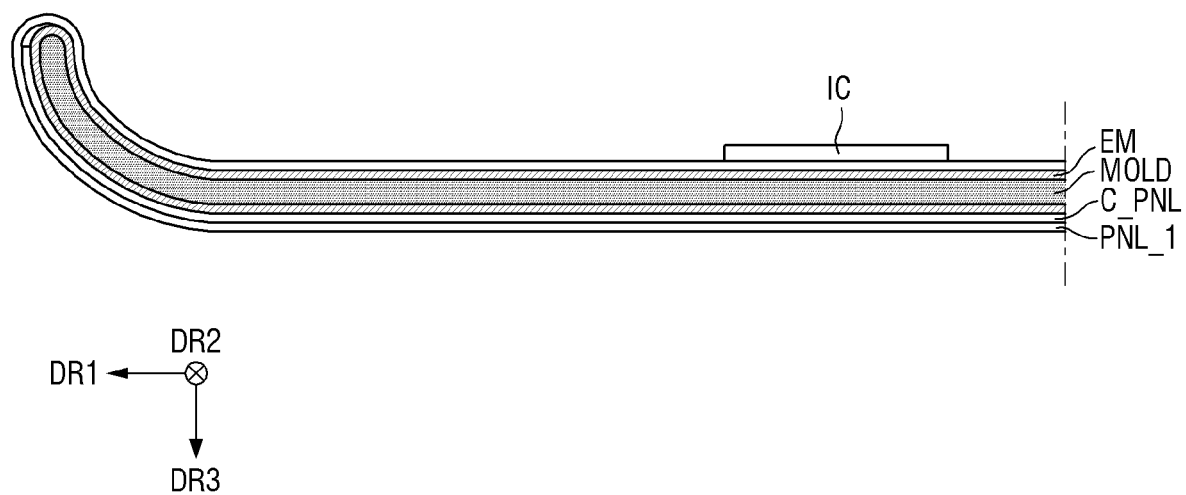
FIG. 14 is a cross-sectional view of a stack structure of a display panel and a first support member of a display device according to one or more embodiments.

FIG. 14 is a cross-sectional view of a stack structure of a display panel and a first support member of a display device according to one or more embodiments.

A display device 1 according to the present embodiment is different from the embodiment of FIG. 7 in shapes of a metal member EM and a display device 1.

Referring to FIG. 14, a metal member EM may have a horseshoe shape with an end bent in the first direction DR1 and extending while maintaining a substantially same distance in the first direction DR1. More specifically, the metal member EM may extend to one side in the first direction DR1, be bent and extend toward the other side in the third direction, and may be bent toward one side in the third direction and extend to the other side in the first direction DR1. A substantially same distance may be maintained between opposed ends of the metal member EM.

A display panel PNL on the metal member EM may have substantially the same shape as the metal member EM and cover the metal member EM.

A space between the opposed ends of the metal member EM may be filled with a filling member MOLD. That is, the distance between the opposed ends of the metal member EM may be the same as the thickness of the filling member MOLD. The thickness of the filling member MOLD may be adjusted depending on the product. Accordingly, the thickness may increase as compared to a case where the metal member EM is folded and in contact with itself. That is, radii of curvature of the metal member EM and the first panel PNL_1 at the end of the first panel PNL_1 may increase. Therefore, panel cracks that occur during compression of curved surfaces may be mitigated.

In the display device according to the embodiments of the present disclosure, shapes of the metal member and the display panel are adjusted and the display panel is internally filled with the filling member, so that panel cracks occurring during compression of curved surfaces and a spring back effect may be prevented, high resistance to external impact may be achieved, and a yield may be improved.

However, the effects, aspects, and features of the embodiments of the present disclosure are not restricted to the one set forth herein. The above and other effects, aspects, and features of the embodiments of the present disclosure will become more apparent to one of daily skill in the art to which the embodiments pertain by referencing the claims.

What is claimed is:
1. A display device comprising:
a display panel comprising a first panel and a second panel, the first panel being located at one side of the second panel in a first direction;

a support member configured to support a bottom surface of the display panel and assist in a sliding motion of the display panel in the first direction; and a filling member covered by the first panel and the support member at an end of the first panel in the first direction, wherein the first panel comprises a first portion, a second portion, and a third portion, the first portion covering one surface of the support member and in contact, at least partially, with an other surface of the support member and extending in the first direction, the second portion being at least partially opposing the first portion and extending in a direction opposite the first direction, and the third portion connecting the first portion and the second portion, wherein the support member overlaps the first portion and the third portion, and is in contact with the filling member, and wherein the support member comprises a first support part overlapping the first portion, a second support part overlapping the second portion, and a third support part overlapping the third portion, the second support part and the third support part being in contact with the filling member.

2. The display device of claim 1, wherein the first support part is in contact, at least partially, with the filling member.

3. The display device of claim 2, wherein a contact area between the filling member and the first support part is greater than a contact area between the filling member and the second support part.

4. The display device of claim 1, wherein the filling member comprises a first filling portion in contact with the support member and a second filling portion exposed from the support member, and wherein the second filling portion is covered by the first panel.

5. The display device of claim 4, wherein the first portion and the second portion of the first panel are parallel to each other.

6. The display device of claim 5, wherein the first panel further comprises a fourth portion and a fifth portion, the fourth portion being connected to the second portion and covers the second filling portion, the fifth portion being connected to the fourth portion and located opposite to the first portion with the first support part interposed therebetween, and the first portion, the second portion, and the fourth portion extend in different directions from one another.

7. The display device of claim 6, wherein the fourth portion extends in a second direction crossing the first direction and has a flat shape.

8. The display device of claim 6, further comprising an adhesive member between the fourth portion and the filling member.

9. The display device of claim 6, further comprising an integrated circuit opposite to the first support part on the fifth portion.

10. A display device comprising:
a display panel comprising a first panel and a second panel, the first panel being located at one side of the second panel in a first direction;
a support member configured to support a bottom surface of the display panel and assist in a sliding motion of the display panel in the first direction; and
a filling member covered by the first panel and the support member at an end of the first panel in the first direction,
wherein the first panel comprises a first portion, a second portion, and a third portion, the first portion covering one surface of the support member and in contact, at least partially, with an other surface of the support member and extending in the first direction, the second portion being at least partially opposing the first portion and extending in a direction opposite the first direction, and the third portion connecting the first portion and the second portion,
wherein the support member overlaps the first portion and the third portion, and is in contact with the filling member, and
wherein the support member comprises a first support part overlapping the first portion, a second support part overlapping the second portion, and a third support part overlapping the third portion, and wherein the third support part comprises a first curved portion curved with a first radius of curvature and a second curved portion connected to the first curved portion and curved with a second radius of curvature that is smaller than the first radius of curvature.

11. The display device of claim 10, wherein the filling member comprises a first filling portion in contact with the support member and a second filling portion exposed from the support member and a contact surface between the first filling portion, and the first curved portion has a curvature different from that of a contact surface between the first filling portion and the second curved portion.

12. The display device of claim 10, wherein a curvature of an overlapping portion between the third portion of the first panel and the first curved portion of the third support part is different from a curvature of an overlapping portion between the third portion of the first panel and the second curved portion.

13. The display device of claim 10, wherein the first support part and the second support part are parallel to each other and have a flat shape.

14. A display device comprising:
a display panel comprising a first panel and a second panel, the first panel being located at one side of the second panel in a first direction;
a support member configured to support a bottom surface of the display panel and assist in a sliding motion of the display panel in the first direction; and
a filling member covered by the first panel and the support member at an end of the first panel in the first direction,
wherein the first panel comprises a first portion, a second portion, and a third portion, the first portion covering one surface of the support member and in contact, at least partially, with an other surface of the support member and extending in the first direction, the second portion being at least partially opposing the first portion and extending in a direction opposite the first direction, and the third portion connecting the first portion and the second portion,
wherein the support member overlaps the first portion and the third portion, and is in contact with the filling member, and
wherein the first panel further comprises a fourth portion connected to the second portion and covers the filling member and a fifth portion connected to the fourth portion and located opposite to the first portion with the support member interposed therebetween, and the fourth portion extending in a second direction crossing the first direction and has a flat shape.

15. The display device of claim 14, further comprising a cover panel between the first panel and the support member.

16. The display device of claim 15, wherein the support member comprises a first support part overlapping the first portion, a second support part overlapping the second portion, and a third support part overlapping the third portion, and the cover panel covers the first support part and cover at least partially the third support part.

* * * * *